2,989,373
PRODUCTION OF NICKEL OXIDE
David M. Llewelyn, Clydach, Swansea, and De Witt H. West, Port Eynon, Swansea, Wales, assignors to The International Nickel Company, Inc., New York, N.Y., a corporation of Delaware
No Drawing. Filed Feb. 4, 1959, Ser. No. 791,004
Claims priority, application Great Britain Feb. 21, 1958
5 Claims. (Cl. 23—183)

The present invention relates to the production of nickel oxide and, more particularly, to a process for producing nickel oxide powder in a high state of purity.

Nickel oxide in a state of high purity is required, for example, in the electronics industry for the production of ferrites but it is difficult to produce. Nickel oxide for ferrite production should preferably be a single phase material and in a very high state of purity, containing not over 0.01% by weight each of elements such as barium, sodium, lithium, chromium, silicon, potassium, strontium, cobalt, copper, lead and titanium and not over 0.05% total residual impurities, e.g., carbon and iron. If massive nickel is subjected to oxidizing roasting, the oxide layer formed protects the underlying metal from oxidation, and if nickel powder is similarly roasted, the particles sinter together before oxidation is complete. Not only is a sintered product undesirable in ferrite production but also once sintering has occurred, complete oxidation is practically impossible without undesirable and expensive operations such as grinding and re-oxidizing.

Although attempts were made to overcome the foregoing difficulties and other difficulties, none, as far as we are aware, was entirely successful when carried into practice commercially on an industrial scale.

It has now been discovered that complete oxidation of nickel powder can be attained by the novel process described herein in which sintering can be substantially entirely prevented and nickel oxide powder can be produced which contains a negligible amount of elemental nickel.

It is an object of the present invention to provide a process in which nickel oxide in a high state of purity is produced.

Another object of the invention is to provide a novel process for the production of pure nickel oxide powder useful in the production of ferrites.

The invention also contemplates providing a process for producing nickel oxide powder which is substantially free of elemental nickel.

It is a further object of the invention to provide a process in which pure nickel oxide is produced from pure nickel powder without the formation of a sintered product.

Other objects and advantages will become apparent from the following description.

Generally speaking, in accordance with the present invention nickel and nickel oxide, both in powder form, are mixed and roasted together. We find that when a mixture of nickel powder and nickel oxide powder is introduced into a roasting zone, sintering can be substantially entirely prevented and if the powder mixture is in the form of a bed during roasting, the necessary porosity of the bed can be maintained.

It is therefore possible to make a product having a composition corresponding to NiO with a negligible amount of elemental nickel in it. A portion of the nickel oxide produced in the process can be bled back to provide the nickel oxide powder which is mixed with the nickel powder to be roasted.

In carrying the invention into practice, it is preferred to use nickel powder that is produced by the thermal decomposition of nickel carbonyl, which is commonly known as carbonyl nickel powder. The nickel powder should have a particle size not larger than about six microns and, advantageously, nickel powder not larger in particle size than about four microns should be used in the operation of this novel process. Carbonyl nickel powder is particularly applicable to this process because of its high purity as it contains less than 0.2% carbon and 0.01% iron and is cobalt- and sulfur-free. The carbon content is reduced during the roasting step of this novel process to less than about 0.04% in the nickel oxide. It is to be noted that cobalt and sulfur impurities are always present in nickel oxide produced by wet methods. Carbonyl nickel powder occurs in two forms depending upon the conditions of decomposition, namely, as discrete particles with a bulk density of between 2 and 2.6 grams per cubic centimeter and a particle size of less than six microns and as aggregates with a fibrous structure resembling cotton wool with a bulk density of between 0.5 and 1.4 grams per cubic centimeter and a particle size of three microns, these being known as "A" powder and "B" powder, respectively. We find that in accordance with the concepts of the present invention, "B" powder yields the better nickel oxide in that it is more porous than the "A" powder, allowing easier access to oxygen during roasting and yielding a softer product.

The roasting of the nickel powder can take place in a fluidized bed furnace or a horizontal kiln or it may be conducted in a band type furnace. The use of a band type furnace is advantageous in that it can be operated continuously and is suitable for handling fine powders. The roasting operation should be conducted at a temperature of between about 500° C. and about 800° C. and preferably at between about 700° C. and about 750° C. using air or an oxidizing gas containing at least about 20% oxygen as an oxidizing medium. Steam, enriched air or pure oxygen may also be used to roast the nickel powder. Advantageously, air is used in oxidizing the nickel powder because it is more economical and yet still produces the desired results, that is, the formation of a high purity, single phase nickel oxide powder. Control of the oxidation step to insure complete oxidation to NiO is accomplished by passing a current of excess air over or through a bed of the mixed powders at a furnace temperature of about 700° C. to about 750° C. for about two hours.

To insure the substantial absence of free metal in the product, it is desirable to include at least 30% nickel oxide in the mixture to be roasted. Naturally, the proportion of metallic nickel in this mixture should be as high as possible, since the object is to convert nickel to the oxide, and for this reason it is advantageous not to include more than 50% nickel oxide in the mixture. The results obtained with varying proportions of carbonyl nickel powder and nickel oxide on roasting the mixture at 700° C. to 750° C. for two hours in an electrically heated furnace and subsequently lightly milling the roasted material are shown in the following table:

| Feed to Roaster, Percent by weight | | Roasted Product | |
|---|---|---|---|
| Ni | NiO | | Mean Particle size, Microns |
| 100 | 0 | Magnetic—free metal present | |
| 80 | 20 | do | |
| 70 | 30 | Non Magnetic—single phase NiO | 4.95 |
| 60 | 40 | do | 4.90 |
| 50 | 50 | do | 4.00 |
| 40 | 60 | do | 4.60 |

For the production of ferrites, the particle size should be small, i.e., of the order of one micron, and for this purpose the oxide produced according to the invention should be heavily milled and sieved to remove any coarse particles. In milling oxides produced according to the invention, if it is desirable to avoid iron contamination, porcelain pots and steatite balls may be used. Otherwise, conventional equipment consisting of steel mill and steel balls gives satisfactory results. High speed ball milling is preferred using a ratio of balls to powder of 1:1. Advantageously, the nickel oxide product is milled for up to about six hours maximum to obtain a material usable for ferrite production.

In carrying out the invention, it is necessary first to produce NiO. Advantageously, pure nickel oxide can be produced by subjecting nickel powder to successive calcination, i.e., oxidation at high temperature, and grinding until fully oxidized. Thereafter, the process can be carried on continuously in a furnace, with advantageously 30% to 50% of the pure nickel oxide produced being bled back and mixed with the feed material. Advantageously, the nickel oxide bled back and/or mixed with the feed material should have an average particle size of not more than about one micron.

The invention is particularly applicable to the production of nickel oxide powder in a high state of purity and containing negligible amounts of metallic nickel for the formation of ferrites. The very pure nickel oxide, in a fine state of subdivision, produced by this novel process can, of course, be utilized for other applications such as the production of sub-micron nickel powder by hydrogen reduction of the oxide at controlled temperatures.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. A process for producing high purity, single phase NiO powder containing substantially no metallic nickel and adapted for use in ferrites for the electronic industry which comprises mixing a mass of discrete, solid particles of carbonyl nickel powder, having a particle size of not more than about four microns and containing less than 0.2% carbon, less than 0.01% iron and no poisonous element from the group consisting of cobalt and sulfur, with a mass of discrete particles of high purity, single phase, solid NiO powder not larger in particle size than about one micron to obtain a mixture of a dispersed mass of discrete, solid, carbonyl nickel powder particles surrounded by discrete, solid NiO powder particles, adjusting said mixture to contain more than about 30% NiO, introducing said mixture of discrete, solid nickel powder particles surrounded by solid NiO powder particles into a roasting zone, roasting said mixture as discrete particles separated from each other at a temperature of between about 500° C. and about 800° C. in an excess amount of oxidizing medium containing at least 20% oxygen, while carefully controlling said roasting operation to avoid sintering and the formation of molten material, to provide a roasted product of high purity, single phase, solid NiO powder substantially devoid of metallic nickel, milling and sieving a portion of said roasted product to a particle size of not larger than about one micron for use in ferrites in the electronic industry, returning the remaining portion of said roasted product to make up the NiO portion of a fresh mixture of solid carbonyl nickel powder and solid NiO powder to be introduced into said roasting zone, in an amount equal to more than about 30% of said fresh mixture, and introducing said fresh mixture into said roasting zone.

2. A process for producing high purity, single phase NiO powder containing substantially no metallic nickel which comprises mixing a mass of discrete, solid particles of nickel powder with a mass of discrete particles of high purity, single phase, solid NiO powder to obtain a mixture of a dispersed mass of discrete, solid nickel powder particles surrounded by discrete, solid NiO powder particles, adjusting said mixture to contain more than about 30% NiO, introducing said mixture of discrete, solid nickel powder particles surrounded by solid NiO powder particles into a roasting zone, roasting said mixture as discrete particles separated from each other at a temperature of between about 500° C. and about 800° C. in an excess amount of an oxidizing medium from the group consisting of air, oxygen-enriched air, oxygen and steam and containing at least 20% oxygen, while carefully controlling said roasting operation to avoid sintering and the formation of molten material, to provide a roasted product of high purity, single phase, solid NiO powder substantially devoid of metallic nickel, returning the remaining portion of said roasted product to make up the NiO portion of a fresh mixture of solid nickel powder and solid NiO powder to be introduced into said roasting zone, in an amount equal to more than about 30% of said fresh mixture, and introducing said fresh mixture into said roasting zone.

3. A process for producing high purity, single phase, NiO powder containing substantially no metallic nickel and adapted for use in ferrites for the electronic industry which comprises introducing a mixture of a dispersed mass of discrete, solid particles of carbonyl nickel powder, having a particle size of not more than about four microns and containing less than 0.2% carbon, less than 0.01% iron and no poisonous element from the group consisting of cobalt and sulfur, surrounded by discrete particles of high purity, single phase, solid NiO powder not larger in particle size than about one micron, while adjusting said mixture to contain more than about 30% NiO powder and the remainder nickel powder, into a roasting zone, roasting said mixture as discrete particles separated from each other at a temperature of between about 500° C. and about 800° C. in excess amount of air, while carefully controlling said roasting operation to avoid sintering and the formation of molten material, to provide a roasted product of high purity, single phase, solid NiO powder substantially devoid of metallic nickel.

4. A process as set forth in claim 2 wherein the mixture of solid nickel powder and solid NiO powder is adjusted to contain not more than about 50% NiO.

5. A process as set forth in claim 3 wherein the mixture of solid nickel powder and solid NiO powder is roasted at a temperature of between about 700° C. and about 750° C.

References Cited in the file of this patent
UNITED STATES PATENTS

| | | |
|---|---|---|
| 1,685,520 | Carveth | Sept. 25, 1928 |
| 2,825,629 | Schumacher et al. | Mar. 4, 1958 |

OTHER REFERENCES

Mellor: "A Comprehensive Treatise on Inorganic and Theoretical Chemistry," vol. 15, page 373, Longmans, Green and Co. (1936).